United States Patent
Faler et al.

(10) Patent No.: US 8,573,008 B2
(45) Date of Patent: Nov. 5, 2013

(54) METHOD FOR PRODUCING OPTICAL FIBER AT REDUCED PRESSURE

(75) Inventors: James Henry Faler, Wilmington, NC (US); Andrey V Filippov, Painted Post, NY (US); Robert C Moore, Wilmington, NC (US); Bruce Warren Reding, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 228 days.

(21) Appl. No.: 13/091,376

(22) Filed: Apr. 21, 2011

(65) Prior Publication Data

US 2011/0289979 A1    Dec. 1, 2011

Related U.S. Application Data

(60) Provisional application No. 61/348,906, filed on May 27, 2010.

(51) Int. Cl.
    *C03B 37/02*    (2006.01)

(52) U.S. Cl.
USPC ............ 65/434; 65/379; 65/424; 65/432; 65/435; 65/533; 65/535

(58) Field of Classification Search
None
See application file for complete search history.

(56) References Cited

U.S. PATENT DOCUMENTS

| | | | | |
|---|---|---|---|---|
| 6,125,638 | A * | 10/2000 | Ji et al. | 62/63 |
| 6,928,840 | B1 * | 8/2005 | Nagayama et al. | 65/424 |
| 2002/0059816 | A1 * | 5/2002 | Nagayama et al. | 65/435 |
| 2004/0107736 | A1 * | 6/2004 | Schuepbach et al. | 65/435 |
| 2006/0002671 | A1 * | 1/2006 | Oku et al. | 385/123 |
| 2007/0022786 | A1 * | 2/2007 | Foster et al. | 65/384 |
| 2009/0038345 | A1 * | 2/2009 | Otosaka et al. | 65/424 |
| 2009/0139270 | A1 * | 6/2009 | Filippov et al. | 65/434 |

FOREIGN PATENT DOCUMENTS

| | | | |
|---|---|---|---|
| JP | 61158838 | | 7/1986 |
| JP | 7149547 | | 6/1995 |
| JP | 07149547 | A * | 6/1995 |
| JP | 2000247688 | A * | 9/2000 |

OTHER PUBLICATIONS

JP2000-247688 Machine Translation Performed Jan. 24, 2013.*
Crane, "Flow of Fluids Through Valves, Fittings, and Pipe", Crane Co. Technical Paper No. 410, pp. 3-24 and 3-25, 1998.*
U.S. Appl. No. 11/986,764, filed Nov. 26, 2007, Costello, III, John Joseph et al.
U.S. Appl. No. 11/998,366, filed Nov. 29, 2007, Filippov, Andrey V., et al.

* cited by examiner

*Primary Examiner* — Matthew Daniels
*Assistant Examiner* — Lisa Herring
(74) *Attorney, Agent, or Firm* — Robert L. Carlson (57) ABSTRACT

An optical fiber production system and method are provided for producing optical fiber. An optical fiber is drawn from a preform in a furnace and passes through a treatment device under a reduced pressure in the range of 0.01 to 0.80 atm. The treatment device cools the bare optical fiber as it cools to a temperature in the range of at least 1,600° C. to 1,300° C. A non-contact fiber centering device is located near an exit of the treatment device to provide centering of the optical fiber as it exits the treatment device.

13 Claims, 9 Drawing Sheets

METHOD FOR PRODUCING OPTICAL FIBER AT REDUCED PRESSURE

CROSS-REFERENCE TO RELATED APPLICATIONS

This application claims the benefit of priority under 35 U.S.C. §119(e) of U.S. Provisional Application Ser. No. 61/348,906, filed on May 27, 2010, the content of which is relied upon and incorporated herein by reference in its entirety.

BACKGROUND

The present invention generally relates to methods and apparatus for forming optical fibers and, more particularly relates to an optical fiber production method for forming and cooling optical fiber.

Conventional manufacturing processes for producing optical fibers typically include drawing an optical fiber from an optical fiber preform in a draw furnace, cooling the drawn fiber, and coating the fiber after it has sufficiently cooled. The optical fiber is typically drawn in a furnace at about 2,000° C. and the heat is typically transported to the preform mostly by radiation, but the flow of gas in the furnace, the result of forced flow from blanketing and natural convection, can also affect the glass temperature. The relative contribution of convective heat transfer is significant at the lower part of the fiber forming zone, the region at the optical fiber preform root and below, where the radiative heat transport becomes negligible due to the small diameter of the fiber.

The gas flow in the furnace, resulting from forced and free convection, typically creates convection cells, and these cells can become unstable under certain conditions of temperature gradient and gas density. This unsteady motion affects the heat transfer in the fiber forming zone enough that the fiber clad diameter can vary significantly, which is generally undesirable. To counteract this effect, helium may be used as the gas in the furnace. Helium reduces the strength of the convection cells and the temperature difference across the cells. This typically results in improved fiber diameter control, but the disadvantage is that helium, which is expensive, is consumed. Additionally, the high temperatures used in the furnace can potentially create defects, typically density fluctuations, in the core of the fiber, the numbers of which are distributed according to thermal equilibrium (e.g., Boltzmann distribution). Defects in the fiber structure usually represent states with higher energy, so the number of defects is typically greater at higher draw temperatures. Such defects in the fiber can introduce signal loss in the optical fiber. To reduce this increased attenuation, it is desirable to cool the fiber slowly, especially between temperatures of 1,600° C. and 1,300° C., to allow the defects time to heal before increasing viscosity of the solidifying glass freezes the defects in. In this temperature range, radiative cooling is negligible, so one can effectively reduce cooling rate by reducing the temperature difference between the fiber and the gas in which it is immersed.

SUMMARY

According to one embodiment, a method for producing an optical fiber is provided. The method includes the steps of drawing a bare optical fiber from a preform in a furnace. The method also includes the step of treating the optical fiber by maintaining the optical fiber in a treatment device to cool the optical fiber at a rate that is slower than the cooling rate that would occur if the fiber was in air at 25° C. and a pressure of 1 atm. The method further includes the step of reducing pressure in at least one of the furnace and the treatment devices such that the pressure in the at least one of the furnace and treatment device is in the range of 0.01 to 0.80 atm.

According to another embodiment, a method of producing an optical fiber is provided that comprises the step of drawing an optical fiber from a heated glass source in a furnace. The method also includes the step of reducing pressure in the furnace such that the pressure in the furnace is in the range of 0.01 to 0.80 atm.

According to a further embodiment, a method of producing an optical fiber is provided. The method includes the step of drawing an optical fiber from a heated glass source in a furnace. The method also includes the step of treating the optical fiber by maintaining the optical fiber in a treatment device to cool the optical fiber at a rate that is slower than the cooling rate of the fiber in air at 25° C. and a pressure of 1 atm, wherein the optical fiber exits the treatment device at a temperature greater than 500° C. The method further includes the step of reducing pressure in the treatment device such that the pressure in the treatment device is in the range of 0.01 to 0.80 atm.

According to yet a further embodiment, an optical fiber production system is provided. The system includes a furnace adapted to contain and heat a glass source from which an optical fiber is drawn. The system also includes a treatment device for treating the optical fiber drawn from the heated glass source. The treatment zone cools the optical fiber at a rate that is slower than the cooling rate of the fiber that would occur if the fiber was being cooled in air at 25° C. and a pressure of 1 atm. The system further includes a vacuum pump configured to reduce pressure in at least one of the furnace and the treatment device to a pressure in the range of 0.01 to 0.80 atm.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Reference will now be made in detail to the present preferred embodiments, examples of which are illustrated in the accompanying drawings. Whenever possible, the same reference numerals will be used throughout the drawings to refer to the same or like parts.

The optical fiber production system and method produces optical fibers through use of a reduced pressure furnace and treatment device. Embodiments of the optical fiber production system and method are herein described in connection with the drawing FIGS. 1-12, wherein like numbers indicate the same or corresponding elements throughout the drawings. The phrase "bare optical fiber" as used herein means an optical fiber directly drawn from a heated glass source also referred to as a preform and prior to applying a protective coating layer to its outer surface (e.g., prior to the bare optical fiber being coated with a polymeric based material). The optical fiber production system and method allows for the formation of optical fiber with reduced defects using efficient and effective fiber cooling and fiber centering techniques as disclosed herein.

Figure 1:
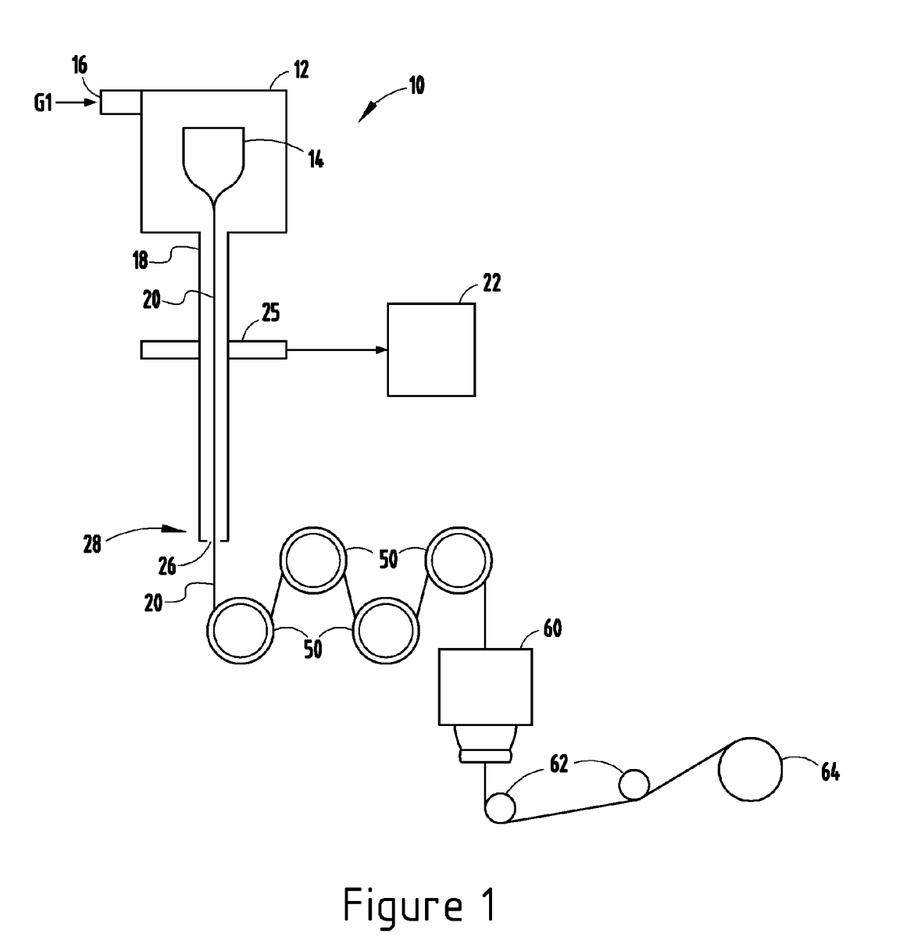
FIG. 1 is a schematic diagram illustrating an optical fiber production system, according to a first embodiment.

Referring to FIG. 1, an optical fiber production system 10 is generally shown, according to one embodiment. The system 10 includes a furnace 12 that may be heated to a temperature of about 2,000° C. A glass optical fiber preform 14 is placed in the furnace 12 and fiber is drawn from the heated preform 14 to create a bare optical fiber 20. The preform 14 may be constructed of any glass or material and may be doped suitable for the manufacture of optical fibers. Once the bare optical fiber 20 is drawn from the preform 14, the bare optical fiber 20 is cooled in treatment device 18 shown and described as a slow-cooling tube, according to one embodiment. The slow-cooling tube or treatment device 18 is shown integrally coupled to the exit of the furnace 12, according to one embodiment. However, it should be appreciated that treatment device 18 could otherwise be distanced from the furnace 12 or otherwise connected thereto according to other embodiments.

As used herein, the term "treatment device" refers to the device downstream from the draw furnace 12 in which the bare optical fiber 20 is cooled at a rate that is slower than the cooling rate of the fiber in air at 25° C. and a pressure of 1 atm, and may include a tube as shown and described herein. The treatment device 18 may be connected to the output of furnace 12 so that it enters the treatment device 18 at a temperature between, for example, about 2,100° C. and 1,600° C. and slow cools the optical fiber 20 at a rate that is slower than the cooling rate of the fiber in air at 25° C. and a pressure of 1 atm. The fiber exits the treatment device 18 at a temperature preferably greater than 500° C. The fiber is preferably treated in the slow cooling treatment device for a time which is sufficient to result in a decrease in attenuation compared to a fiber of identical design which is not treated in the treatment zone. For example, for optical fibers having less than 0.5 wt percent germanium oxide in the core (and also for fibers having cores which are free of germanium oxide), the fiber is preferably treated (slow cooled) within the treatment zone at least during the time period that the fiber temperature is between 1,800° C. and 1,200° C., more preferably while the fiber temperature is between 1,700° C. and 1,200° C., and even more preferably while the fiber temperature is between 1,600° C. and 1,300° C. For optical fibers having greater than 0.5 wt percent germanium oxide in the core, the fiber is preferably treated (slow cooled) within the treatment zone during the time period that the fiber temperature is between 1,600° C. and 900° C., more preferably while the fiber temperature is between 1,500° C. and 1,000° C., and even more preferably while the fiber temperature is between 1,400° C. and 1,000° C. However, because the treatment device utilizes lower than atmostpheric pressures, these temperature ranges can be achieved in the treatment device while simultaneuously adding an amount of heat which is significantly less than the amount which would otherwise be added if the treatment device was at or above atmospheric pressure (about 1 atm). The centering device 32 is preferably located within 1 meter, more preferably within 0.5 meter, even more preferably within 20 centimeters, and most preferably within 15 centimeters of the bottom of the draw furnace. The average cooling rate of the fiber in the treatment device 18 is defined as the fiber surface temperature at the entry point of the fiber into the treatment device (the fiber entry surface temperature) minus the fiber's surface temperature at the exit point of the fiber out of the treatment device 18 (the fiber exit surface temperature) divided by the total residence time of the fiber in the treatment device 18. In one embodiment, the optical fiber is subjected to an average cooling rate in the treatment zone of the treatment device defined as a fiber entry surface temperature minus a fiber exit surface temperature divided by the total residence time of the optical fiber in the treatment zone of the treatment device of less than 5,000° C./second, wherein the surface temperature of the optical fiber exiting the treatment device 18 is at least about 500° C., more preferably at least about 800° C.

The slow-cooling or treatment device 18 is shown having one or more pressure reducing or vacuum ports 25 connected to a vacuum pump 22. The vacuum pump 22 creates a reduced pressure or partial vacuum within the treatment device 18 and, in the embodiments shown, may also create a reduced pressure or a partial vacuum within the furnace 12 which is connected thereto. A single vacuum pump 22 is shown coupled to a single vacuum port 25 in the embodiment shown. However, it should be appreciated that one or more vacuum ports and/or one or more vacuum pumps may be employed to achieve the desired reduced pressure in one or more chambers of the treatment device 18 and/or furnace 12. The treatment device 18 advantageously is configured to cool the bare optical fiber 20 in a controlled environment as it passes from the furnace 12 to the exit port 28.

In addition, a gas inlet 16 is shown for providing an inert gas, shown as G1, as an input to the furnace 12. The inert gas may include argon (Ar), according to one embodiment, to reduce the amount of ambient gas reaching the furnace 12. According to another embodiment, the inert gas may include nitrogen ($N_2$). It should be appreciated that more than one gas inlet may be employed at various locations of the furnace 12 and treatment device 18. It should be appreciated that the reduced pressure in the furnace 12 and treatment device 18 advantageously reduces the density of the gas therein such that an expensive gas, such as helium (He), is not needed. The reduced pressure provided in the furnace 12 and treatment device 18 allows for the reduction in density of the argon and/or nitrogen gases to density levels close to that of helium, and still enables uniform temperature distributions within the draw furnace.

In the embodiment shown in FIG. 1, the bare optical fiber 20 drawn from preform 14 passes out through the bottom of the furnace 12, through the treatment device 18, out exit port 28, and then passes through one or more fluid bearings 50. The fluid bearings 50 may shift the bare optical fiber 20 from moving along a substantially first or vertical pathway to a second pathway and further cool the bare optical fiber 20 in ambient air at atmospheric pressure. The one or more fluid bearings 50 may include fluid bearings disclosed in U.S. patent application Ser. No. 11/986,764, filed Nov. 26, 2007 (and provisionally filed as U.S. patent application Ser. No. 60/861,587) and U.S. patent application Ser. No. 11/998,366, filed Nov. 29, 2007, the disclosures of which are hereby incorporated herein by reference. Following the ambient air cooling, the bare optical fiber 20 is then subjected to a coating unit 60 where a primary protective coating layer is applied to the outer surface of the bare optical fiber 20. After leaving the coating unit 60 the optical fiber with a protective layer can go through a variety of processing stages within the production system 10 such as tractors or rollers 62 and onto fiber storage spool 64. One of rollers 62 may be used to provide the necessary tension on the optical fiber as it is drawn through the entire system and eventually wound onto the storage spool 64.

The optical fiber production system 10 utilizes a treatment device 18 at the output of the furnace 12 to cool the drawn bare optical fiber 20 at one or more desired cooling rates. The treatment device 18 includes a long tube extending at one end from the furnace exit and a small orifice 26 at the exit port 28 at the opposite end of the tube through which the bare optical fiber 20 exits. The tube 18 may have a length in the range of 1.0 to 10 m, more preferably in the range of 2 to 8 meters (m). In some embodiments, the tube 18 may be greater in length than 3 meters, 4 meters, and in some instances greater than 5 meters. Having the treatment device 18 with a longer length allows for fiber to be drawn at faster speeds and still achieve the residence time necessary to achieve desired attenuation reduction. For example, significant attenuation reduction can be achieved in such devices while drawing the fiber at speeds greater than 20 meters/second, 25 meters/second and in some cases greater than 30 meters/second. For example, in one embodiment, the length of the treatment device is about 6 meters. The first fluid bearing 50 downstream of the exit port 28 acts as a non-contact fiber centering device in close proximity to the orifice 26 to stabilize the lateral XY position of the bare optical fiber 20 as it goes through the orifice 26 and hence eliminates the possibility of the bare optical fiber 20 touching the sides of the orifice 26. The first fluid bearing 50 that acts as a centering device is located less than 2 meters (78.8 inches) from the exit port 28, according to one embodiment, and more preferably is less than 30.5 cm (12 inches) from the exit orifice 26.

The interior of the furnace 12 and treatment device 18 is evacuated to a reduced pressure that is substantially lower than one atmosphere via vacuum pump 22 and is preferably in the range of 0.01 to 0.80 atm. In the embodiment shown, the vacuum pump 22 evacuates gas at the vacuum port 25 located upstream from the tube exit 28. The reduced pressure provided by the vacuum pump 22 suppresses the time varying flows within the furnace 12, thereby eliminating the need to use helium to achieve a stable diameter fiber, and suppresses convective cooling of the bare optical fiber 20 in the tube 18, making the tube 18 a slow-cooling device which improves the fiber attenuation Ambient air ingress is minimized by sealing the top of the furnace 12 and providing a small circular opening in the exit orifice 26 of the treatment device 18 to avoid furnace degradation due to ambient air, specifically oxygen, entering the furnace 12. The size of the exit orifice 26 may be a diameter in the range of 1 to 2 mm, which is suitable for a bare optical fiber having a diameter of about 125 microns, according to one embodiment, or about 10 times greater than the diameter of the bare optical fiber 20. Residual air may be discouraged from traveling through the exit orifice 26 and up the tube 18 into the furnace 12 by having a low level flow of inert gas, such as argon, flowing from the gas input 16 in the furnace 12 to the evacuation port 25 within the tube 18.

Ambient air that enters the treatment device 18 through orifice 26 enters the orifice 26 at a high speed that may be supersonic. The high speed air may cause the bare optical fiber 20 to vibrate and thus move laterally in the XY directions. Excessive lateral movement could cause the fiber 20 to contact the orifice 26, which may degrade the fiber strength and may interrupt the draw process. By employing the non-contact fiber centering device 50, the fiber 20 is stabilized in the lateral or XY directions in the immediate proximity of the orifice 26. The first fluid bearing centering device 50 is a non-contact device for centering the bare optical fiber to prevent mechanical contact of the bare optical fiber 20 with the structure of the treatment device 18. By mechanical contact, we mean contact with a solid component in the draw process.

The optical fiber production system 10 advantageously improves control of the fiber diameter and enables a significant amount of slow cooling of the optical fiber by coupling the furnace 12 to the slow-cooling tube 18 and reducing the internal pressure of both, according to one embodiment. The reduced pressure reduces the convective component of the heat transfer in the furnace 12 and improves the stability of the convection currents. The effect is that the heat transfer is steadier, which improves the fiber diameter control. Lower pressure in the treatment device 18 further reduces the cooling rate by decreasing the convective component of the cooling to achieve a desired cooling rate.

The reduced pressure in the furnace 12 and treatment device 18 may be in the range of 0.01 to 0.80 atm (7.6-608.0 torr), which provides maximum reduction in each heat transfer rate. According to other embodiments, the pressure may be in the range of 0.02 to 0.65 atm (15.2-494.0 torr), and more preferably, in the range of 0.05 to 0.5 atm (38.2-380.0 torr). It should be appreciated that reduced pressure allows for a slower cooling in the treatment device 18, whereas with higher pressures it may be desirable to heat the treatment device 18, such as by heating the outside walls to achieve slow cooling.

To achieve maximum optical loss reduction in the bare optical fiber 20, the cooling rate for temperatures between 1,600° C. and 1,300° C. should be no more than 5,000° C. per second, and more preferably no more than 3,000° C. per second, and most preferably no more than about 2,000° C. per second, to permit the fiber core to heal as many defects, or density fluctuations, as possible. The cooling rate in the treatment device 18, particularly within the treatment zone may include multiple cooling rates, such as a cooling rate of 1,500° C. per second to 4,000° C. per second for a faster cooling region and a cooling rate of 1,600° C. per second to 1,300° C. per second in a slower cooling region. The optical fiber 20 may pass through the treatment device 18 at a speed in excess of 20 meters per second for a time period of 0.2 seconds or less and cool the optical fiber by a temperature drop of at least 800° C. per second, according to one embodiment. At speeds of greater than 20 meters/second, more preferably 25 meters/second, and most preferably greater than 30 meters/second, achieving a cooling rate of about 2,000° C. per second is facilitated by a treatment device 18 length of about six meters or more. It is desirable to cool the bare optical fiber 20 more quickly once it has reached 1,300° C. and thus the bare optical fiber 20 may leave the treatment device 18 at a temperature of less than 1,300° C., more preferably less than 1,200° C., and in some embodiments less than 1,100° C. The bare optical fiber 20 has to remain within the treatment device 18 for controlled cooling and exits the treatment device 18 at a temperature greater than 500° C., and may in some embodiments exit the treatment device 18 at a temperature of greater than 800° C. The bottom of the tube 18 is positioned close to the centering device 50 to ensure adequate centering of the bare optical fiber within the exit orifice 28. In one embodiment, the exit orifice 28 has a length at least twice the diameter of the orifice.

The cooling rate within the treatment device 18, particularly within the treatment zone, may be controllable within the 1,600° C. to 1,300° C. window to achieve maximum loss reduction. Slower cooling at the lower end of the temperature window may further reduce the fiber core fictive temperature, which may result in a reduced number of density fluctuations and improved loss. According to one embodiment, the treatment device 18 may be configured to initially slow cool the bare optical fiber 20 from 1,600° C. to 1,450° C., to then reduce the cooling speed further from 1,450° C. to 1,300° C., and to then accelerate cooling below 1,300° C. Examples of methods to either accelerate or slow the fiber cooling in the treatment device 18 are provided as follows.

Figure 2:
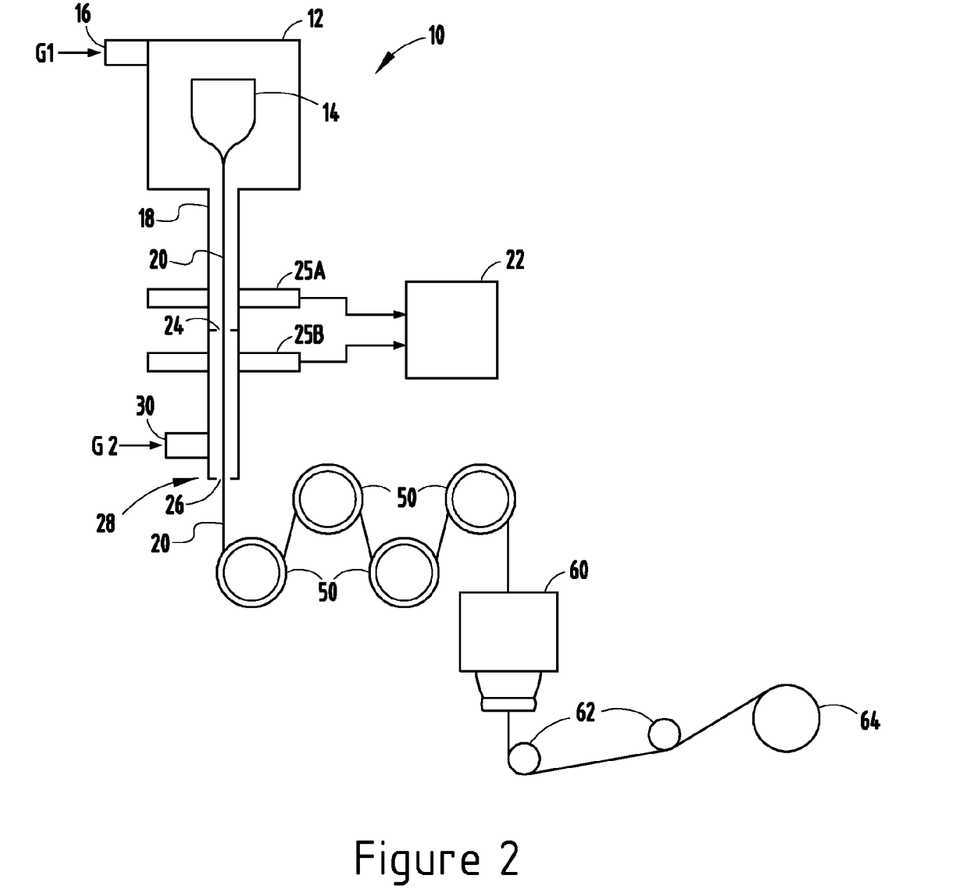
FIG. 2 is a schematic diagram illustrating an optical fiber production system, according to a second embodiment.

According to one embodiment as shown in FIG. 2, the optical fiber production system 10 may employ multiple stages of reduced pressure or partial vacuum, such as a two-stage vacuum having a first vacuum port 25A and a second vacuum port 25B connected to vacuum pump 22. For this two-stage vacuum embodiment, there may be a first orifice 26 at the exit 28 and a second orifice 24 about 1 meter up from the exit 28. The first orifice 26 may have a first size circular diameter, such as a 1 millimeter diameter, and the second orifice 24 may have a second size circular diameter larger than the first orifice diameter, such as a 1.5 millimeter diameter, to generate reduced pressures of about between 0.9 and 0.4 atm in the bottom zone between orifices 24 and 26 and between 0.4 and 0.2 atm in the top zone above orifice 24. This results in a first cooling rate (Rate 1) in the zone or chamber above orifice 24 and a second cooling rate (Rate 2) in the zone or chamber below orifice 24. In this example, the bare optical fiber 20 cools more quickly in the higher pressure regions, as the heat transfer coefficient h, which is a measure of the efficiency of heat transport, depends on the Reynolds number and hence on pressure. For example, according to the heat-transfer correlation published by Kase and Matsuo for fibers in air (J. Poly. Sci. A, 3, 2541-2554 (1965)), $Nu=hD/\kappa=0.42 Re^{0.334}$, where Nu is the Nusselt number (dimensionless heat transfer coefficient), $\kappa$ is the thermal conductivity of ambient air, Re is $V_f D/\upsilon$, $V_f$ is the fiber speed, D is the fiber diameter, and $\upsilon$ is the kinematic viscosity of ambient air=$\mu/\rho$, where $\mu$ is the dynamic viscosity of air and $\rho$ is the density. As the thermal conductivity and the viscosity are nearly independent of the pressure, $h \sim P^{0.334}$. Hence, doubling the pressure leads to an increase in the heat transfer coefficient h of about twenty-five (25) percent. Additionally, by using multiple orifices 24 and 26, particularly more than two orifices (see FIGS. 3 and 4), fiber vibration is reduced because the pressure drop across each orifice is reduced.

By adding more orifices, the overall vibration of the bare optical fiber 20 may be reduced. The reduced vibration makes it less likely that the bare optical fiber 20 will contact the orifices 24 and 26 and hence the distance between the orifices 24 and 26 and the first fluid bearing centering device 50 may be extended and the treatment device 18 could be designed with a shorter length. As cooling rates in the ambient air at or near atmospheric pressure are substantially higher than those at subatmospheric pressure, the fiber temperature may be decreased significantly by traveling through the centering device 50.

Additionally, a first gas with a low thermal conductivity $\kappa$ may be input to the furnace at the gas G1 input 16 such that it passes in the upper section of the treatment device 18 and a second gas with a higher thermal conductivity $\kappa$ may be employed in the bottom section of the treatment device 18 input at gas input 30 labeled G2. For example, if argon (Ar) were purged in at the top as gas G1 and removed via the first vacuum port 25A, vacuum 1, the heat transfer coefficient h could be as much as forty (40) percent higher in the bottom section, even if both were at the same pressure. In the multiple orifice embodiment, the composition of the gases could be changed between each orifice, for example, by purging argon in each section.

In the embodiment shown in FIG. 2, the Rate 1 cooling zone may be a slow cooling rate, relative to the Rate 2 cooling zone which is a higher cooling rate, according to one embodiment. However, it should be appreciated that the Rate 1 and Rate 2 cooling zones may be the same, or the Rate 2 zone may have a slower cooling rate than the Rate 1 cooling zone, according to other embodiments. It should further be appreciated that more than two orifices and/or more than two vacuum ports may be employed to create more than two cooling rates within the treatment device 18, according to further embodiments.

As the bare optical fiber 20 moves through the treatment device 18, the fiber 20 picks up a boundary layer of gas. The boundary layer is at least partially stripped at each orifice, thereby reducing the likelihood of its transitioning to turbulence and thereby further improving fiber stability. Heat transfer is also higher through a thinner boundary layer as compared to a thicker boundary layer. The boundary layer also grows more quickly at lower pressure, however. The pressure in each chamber between the orifices can be controlled individually, for example, by changing the orifice size leading into each chamber (the orifice could be an adjustable diaphragm such as an iris) or by changing the flow rate of gas evacuated from each chamber via an adjustable valve. In doing so, the heat transfer rate can be optimized while minimizing the fiber vibration.

Figure 3:
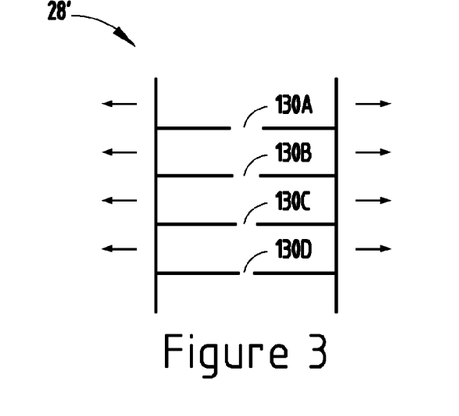
FIG. 3 is a cross-sectional view of a seal employing multiple size openings for use in the treatment device of an optical fiber production system, according to one embodiment.

According to another embodiment, the exit port 28 may employ a multiple orifice seal 28', such as that shown in FIG. 3, which includes four circular orifices 130A-130D substantially centered or concentric about each other and the centered about the expected trajectory of the fiber 20. The four orifices have different sized openings in the embodiment shown. The space in chambers between adjacent orifices may be connected to the vacuum pump to create multiple pressure stages. According to one example, orifice 130A may have a diameter of between about 2.5 and 5.0 mm, orifice 130B may have a diameter of between about 2.0 and 4.0 mm, orifice 130C may have a diameter of between about 1.5 and 3.0 mm, and orifice 130D may have a diameter of between about 1.0 and 2.5 mm. By providing different sized diameters at the orifices 130A-130D as the fiber 20 exits the exit port 28', the boundary layer at each orifice may be stripped, thereby diminishing turbulence and providing for improved fiber stability as it exits the exit port 28. The distance between adjacent orifices may be in the range of 0.5 to 4.0 inches, according to one embodiment.

Figure 4:
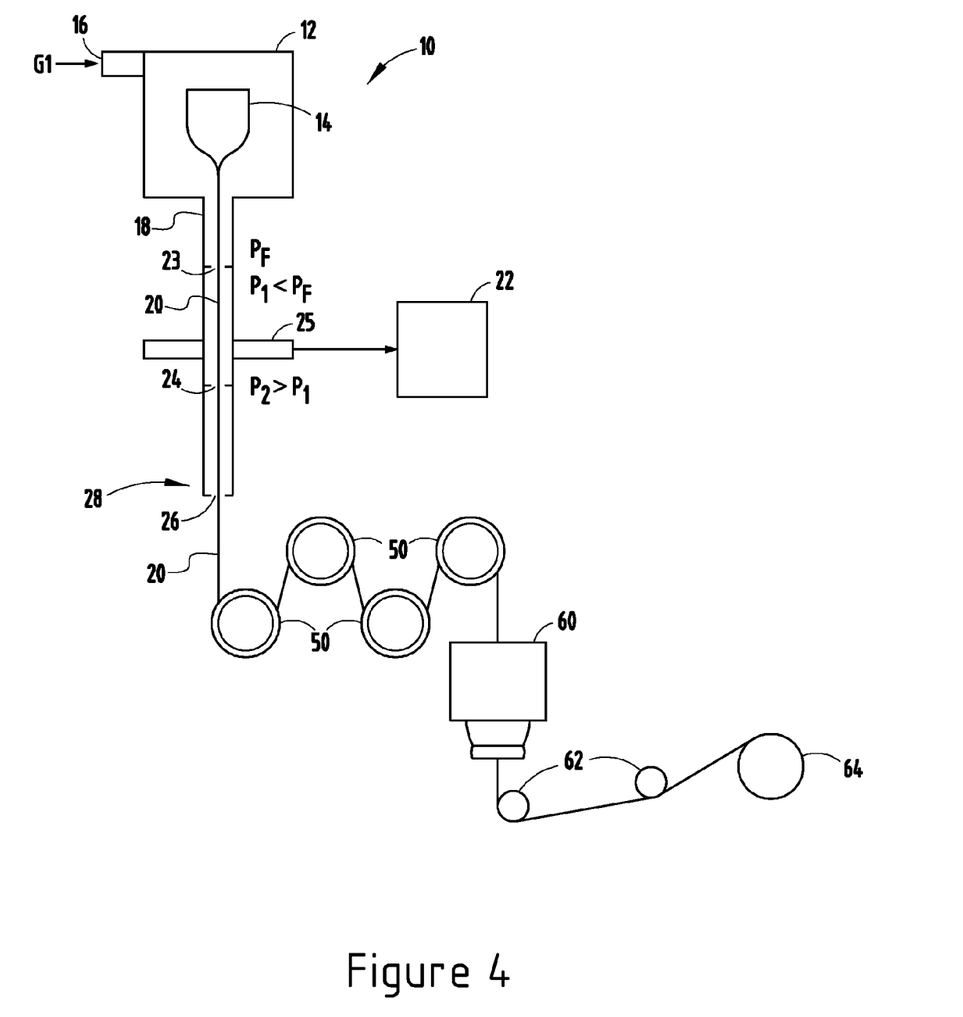
FIG. 4 is a schematic diagram illustrating an optical fiber production system employing a plurality of orifices, according to a third embodiment.

Referring to FIG. 4, an optical fiber production system 10 is shown employing three orifices in the treatment device 18, according to a third embodiment. In this embodiment, exit port 28 employs first orifice 26. A second orifice 24 is located above or upstream of the first orifice 26, and a third orifice 23 is located further above or upstream of the second orifice 24. A vacuum port 25 connected to vacuum pump 22 is located between the second orifice 24 and third orifice 23. In this embodiment, the furnace has a pressure shown as pressure $P_F$, whereas the reduced pressure between the second and third orifices 24 and 23 has a pressure $P_1$, and the reduced pressure between the first orifice 26 and second orifice 24 has a third pressure $P_2$. In one embodiment, the pressure in the intermediate zone of pressure $P_1$ is less than the furnace pressure $P_F$, and the pressure $P_2$ in the bottom zone is greater than the first pressure $P_1$. Thus, three discrete reduced pressures may be provided in three discrete zones or chambers of the treatment device 18 to achieve different rates of cooling. It should be appreciated that the size of one or more of the orifices 23, 24 and 26 may be the same, or may be of different size to achieve the desired pressures. By selecting the appropriate pressure within each zone or chamber, controlled cooling of the bare optical fiber 20 may be effected.

Figure 5:
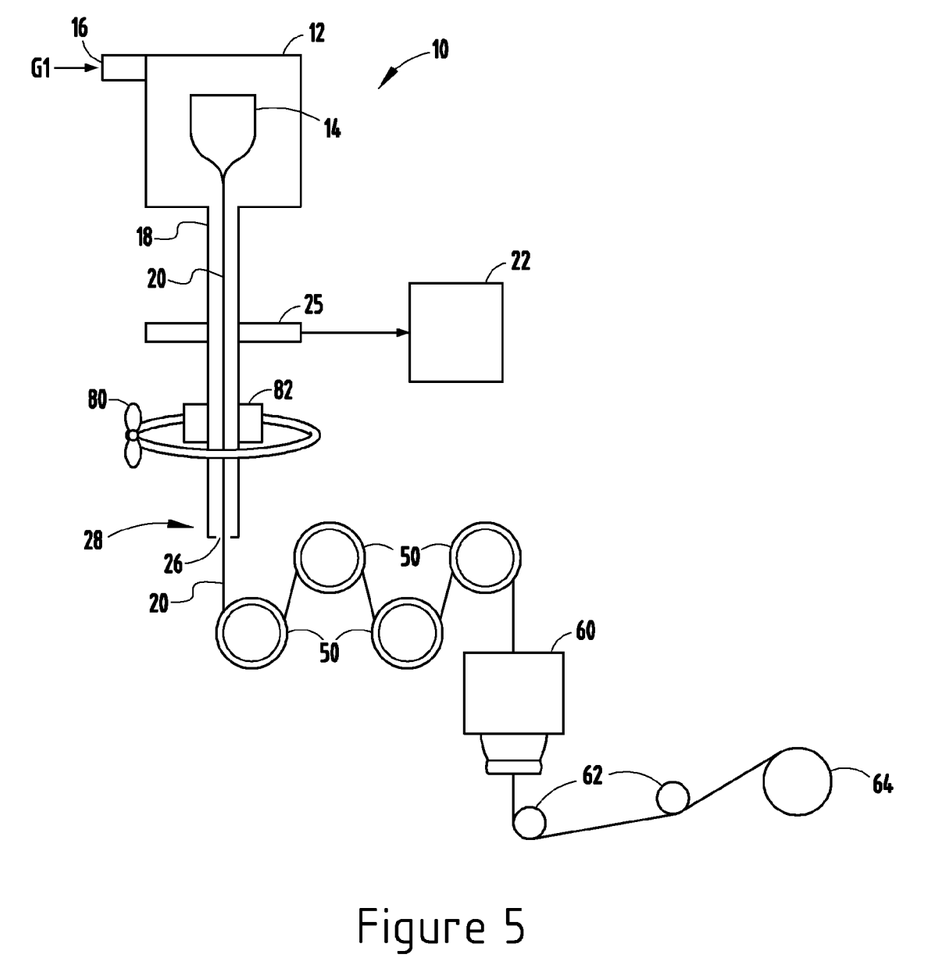
FIG. 5 is a schematic diagram illustrating an optical fiber production system employing a cooling fan, according to a fourth embodiment.

Referring to FIG. 5, an optical fiber production system 10 is shown according to a fourth embodiment employing one or more fans 80 in thermal heat transfer relationship with the fiber 20 to further cool the fiber 20 in treatment device 18. The one or more fans 80 are shown circulating convection cooling gas within a chamber 82 to further cool the bare optical fiber 20 within treatment device 18. The chamber 82 may include a closed circuit chamber having a gas, such as an inert gas, in direct fluid convection contact with the bare optical fiber 20. The fan(s) 80 further enhances the convection rate of cooling within the chamber 82, which may be controlled based on fan speed so as to adjust and achieve the desired cooling rate. Additionally, it should be appreciated that one or more fans may be employed in indirect heat transfer relationship with the bare optical fiber 20 to further achieve desired cooling of the treatment device 18 to achieve a desired cooling rate. The cooling fan(s) 80 could be employed as shown in the bottom section of the treatment device 18 in the rapid cooling zone, to provide cross-flow which increases the heat transfer, or could be employed elsewhere.

Figure 6:
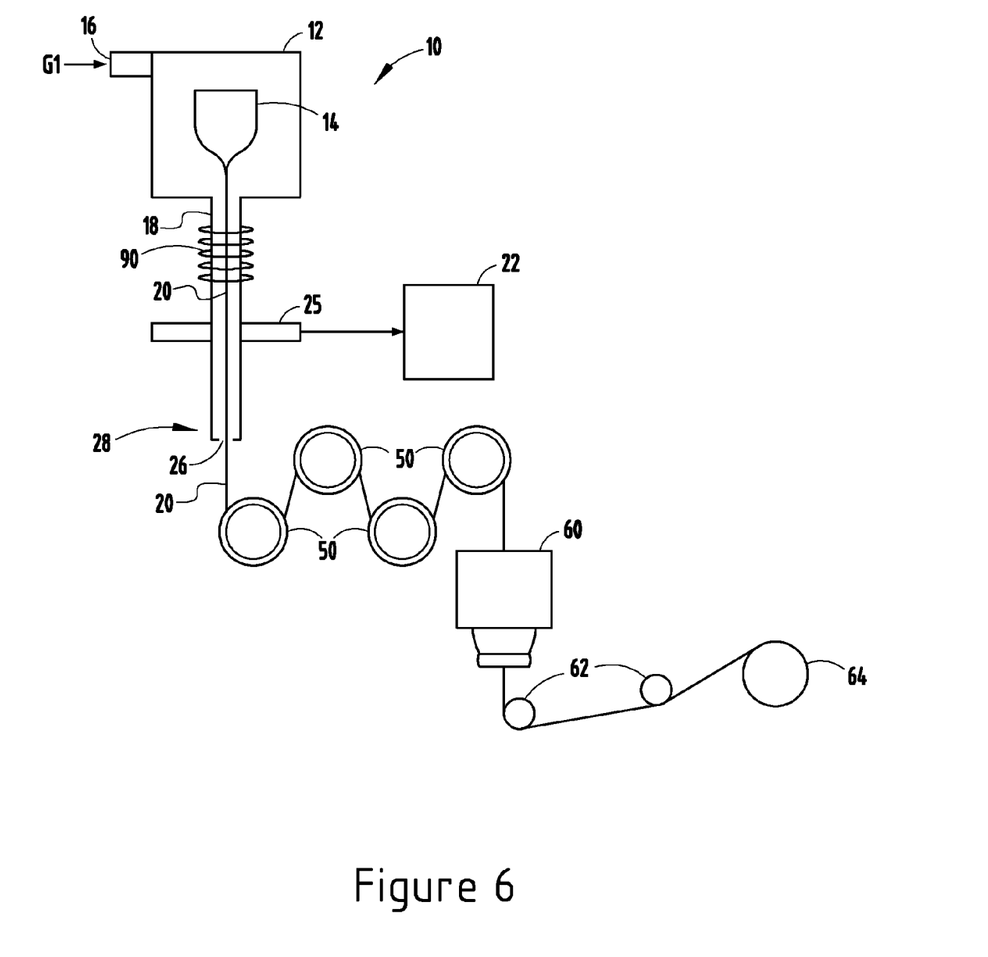
FIG. 6 is a schematic diagram illustrating an optical fiber production system employing a heated zone, according to a fifth embodiment.

Referring to FIG. 6, an optical fiber production system 10 is shown according to a fifth embodiment employing one or more electrical heaters 90 providing a heated zone in thermal heat transfer relationship with the treatment device 18. The one or more heaters 90 may include electric heater coils applied to the outside of the treatment device 18 to provide an elevated temperature in the range of 200° C. to 600° C., according to one embodiment. According to a further specific embodiment, the temperature of the heated zone may be at approximately 300° C. The heater 90 provides additional control of the cooling rate of the treatment device 18.

By heating the slow-cooling zone portion to a lesser degree than was done in the past, a slower cooling rate may be realized at the reduced pressure. For example, a cooling rate at 0.2 atm in air with a 300° C. wall temperature may be equivalent to a 900° C. treatment device 18 at 1.0 atm. Consequently, in some embodiments that employ a heated treatment device 18, the treatment device is heated to a temperature between about 200° C. to 600° C., while maintaining a pressure between about 0.02 to 0.50 atm (15.2-380.0 torr), more preferably in the range of 0.05 to 0.3 atm (38.2-228 torr). Meanwhile, the heat transfer in the fast-cooling zone may be accelerated, as the walls would not be heated. To optimize the cooling rate in the slow-cooling zone, the temperature profile could be adjusted such that the rate is slowest in the critical 1,300° C. to 1,450° C. region. It should further be appreciated that several of the embodiments may be used together and combined such as multiple orifices, different gases, one or more fans in the lower section, a heated zone in the top section, and other modifications to further separate the heat transfer rates in the slow and fast-cooling zones and achieve desired optimal fiber cooling.

Further embodiments may include optimizing the location of the vacuum port 25, such that the gas travels in the same direction as the fiber in a slow-cooling zone and travels in the direction opposite to the fiber in a faster cooling zone. If the gas velocity is half of the fiber velocity, then the heat transfer coefficient h could be reduced by roughly twenty (20) percent in the slow-cooling zone and increased by the same amount in the fast-cooling zone, according to one example. In one embodiment, the vacuum port 25 may be applied optimally by ring exhaust to prevent the air jet from deviating from the axial path.

Figure 7:
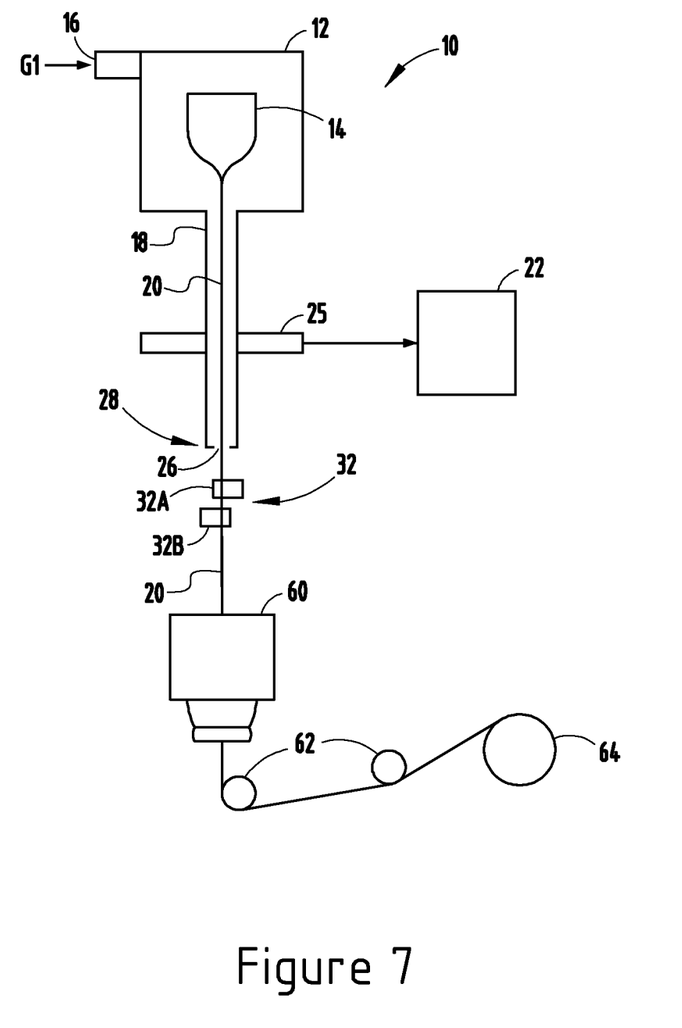
FIG. 7 is a schematic diagram illustrating an optical fiber production system employing a linear non-contact centering device, according to a sixth embodiment.

Referring to FIG. 7, an optical fiber production system 10 is shown according to a sixth embodiment employing a linear non-contact centering device 32. The linear non-contact centering device 32 is located close to the exit port 28 so as to center the bare optical fiber 20 exiting orifice 26 so as to prevent mechanical contact of the bare optical fiber 20 with exit orifice 26. The centering device 32 is a linear centering device that centers the fiber 20 as it passes along a straight line. As used herein, the term "linear" refers to a substantially straight line. The centering device 32 may be located within 1 meter from the exit orifice 26 and is preferably 0.5 meter from the exit orifice 26 and more preferably within 20 centimeters, and most preferably within 15 centimeters. In one embodiment, the fiber entrance side of the centering device 32 (top of element 32A) is within the range of 2.54 centimeters (1.0 inches) to 15 centimeters of the exit orifice 26.

Figure 8:
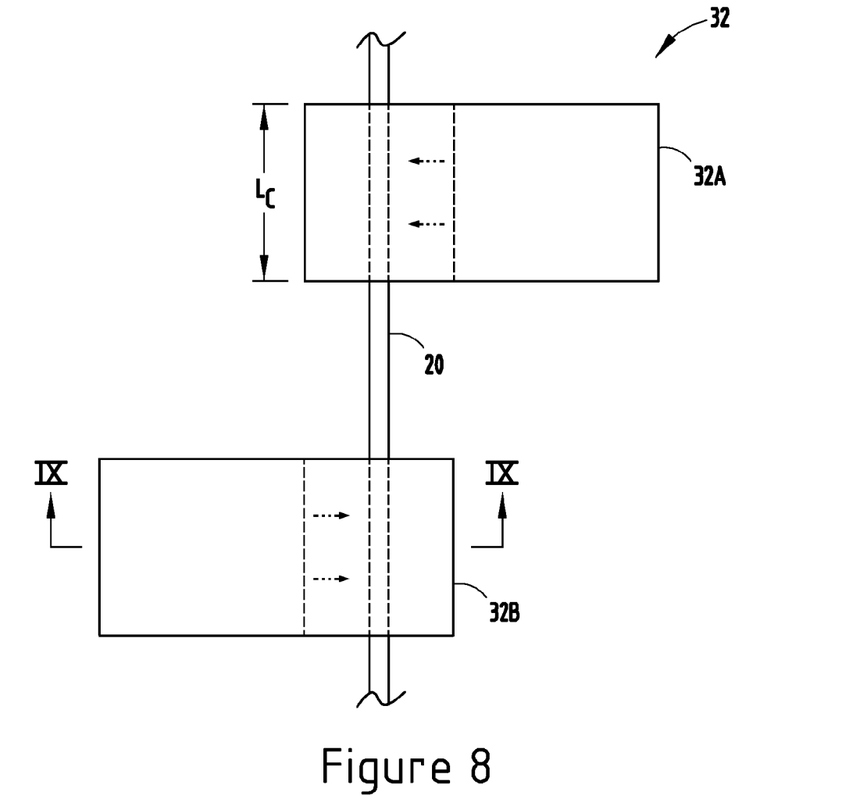
FIG. 8 is an enlarged schematic view of a linear non-contact fiber centering device shown in FIG. 7 for centering the fiber exiting the treatment device, according to a first embodiment.
Figure 9:
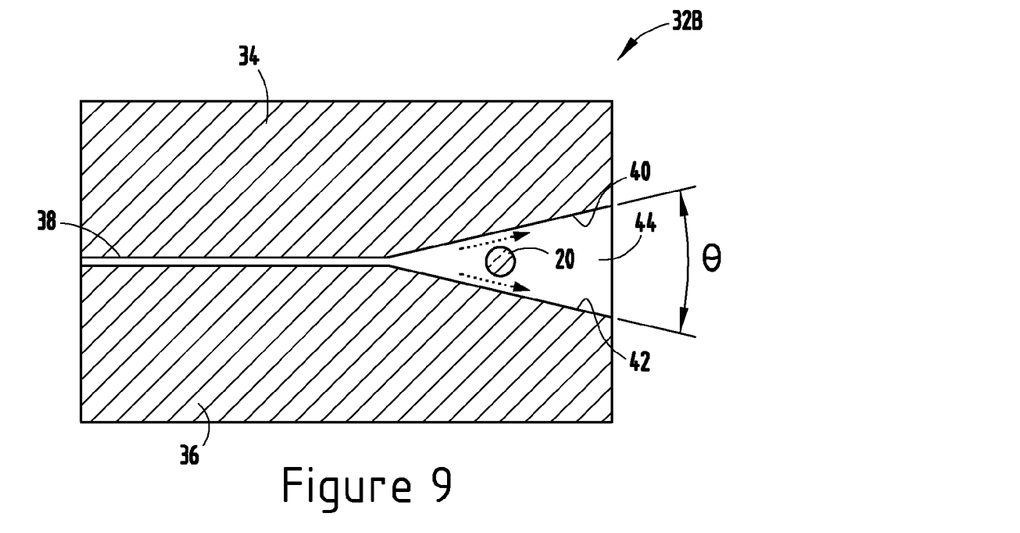
FIG. 9 is an enlarged cross-sectional view of the fiber centering device taken from line IX-IX in FIG. 8.
Figure 10:
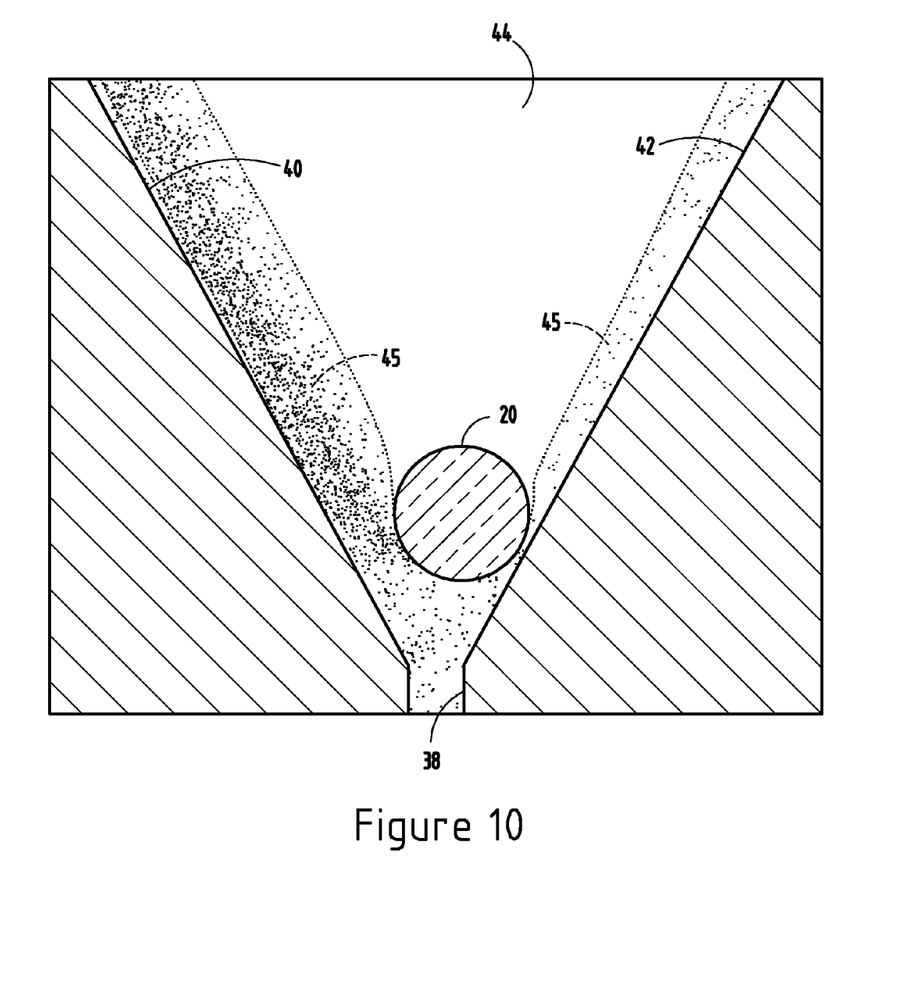
FIG. 10 is an enlarged sectional view of the fiber centering device shown in FIG. 9 further illustrating air flow relative to the fiber.

The centering device 32 is shown in more detail in FIGS. 8-10, according to a first embodiment. The centering device 32 is shown in FIG. 8 having a first linear centering device 32A for centering the bare optical fiber 20 on one side and a second linear centering device 32B for centering the bare optical fiber 20 on the opposite side. Each of the first and second centering devices 32A and 32B has a high pressure fluid (air) channel 38 leading to a wedge-shaped opening 44 as shown in FIG. 9. The wedge-shaped channel 44 has opposite angled side walls that result in a wall-to-wall full angle θ in the range of 10° to 60°, according to one embodiment, which is equivalent to a half angle of 5° to 30° relative to a horizontal line in FIG. 9. According to another embodiment, the wedge has an angled side wall that results in a wall-to-wall full angle θ in the range of 1° to 60°, and more preferably between 10° to 60°, and yet more preferably between 40° to 60°.

According to a further embodiment, the full angle θ is in the range of 1° to 10°. The bare optical fiber 20 is suspended within the wedge-shaped opening 44 by high pressure fluid exiting from a fluid delivery channel 38 through wedge-shaped channel 44. In doing so, gas, such as air 45 supplied by an air jet and through delivery channel 38, flows on both sides of the bare optical fiber 20 as seen in FIG. 10 to form a fluid bearing that suspends the bare optical fiber 20 in a manner that prevents contact with any structure of the centering device 32. The fluid, generally a gas and typically dry air, is forced in the region such that a bare optical fiber under draw tension is retained within the region of the wedge-shaped channel 44 and levitated within the channel 44 substantially as a result of a pressure differential which is present below the fiber 20 within the channel. Thus, the bare optical fiber 20 is self-located and centered within the wedge-shaped channel 44.

As seen in FIG. 9, the individual centering elements 32A and 32B may each be made up of a first side member 34 and a second side member 36. The air delivery channel 38 may be formed as a slot at the interface of members 34 and 36. The first side member 34 has an angled wall 40 and a second side member 36 has an angled wall 42 that together form the wedge-shaped channel 44 leading from the air channel 38. The slot of the air delivery channel 38 and wedge-shaped channel 44 have a depth or length that defines the effective length $L_C$ of the air cushion applied to the fiber 20. It should be appreciated that while centering element 32B is shown in FIG. 9, that centering element 32A may be identically formed, but is shown in FIG. 8 oriented at 180° relative to element 32B.

Each of the first and second centering elements 32A and 32B provide linear or straightened segments for centering the bare optical fiber 20 located in an expanding volume channel 44 with high speed air flowing from the outlet of delivery channel 38 at the vortex of wedge-shaped channel 44 to the ambient environment. The speed of the air applied to the fiber 20 may be in the range of 25 meters/second (m/s) to 500 m/s. The length of the fiber element $L_C$ subjected to centering by each of elements 32A and 32B can be between several millimeters and several centimeters, such as in the range of 0.5 cm to 100 cm. The centering elements 32A and 32B produce a strong centering force on the wall-to-wall direction, but only a lift force in the other direction, thereby pulling the bare optical fiber 20 away from the exit of the air delivery channel 38. By combining two or more pairs of linear centering elements 32A and 32B as shown, the combination allows the bare optical fiber 20 centering in opposite lateral directions, with little or no effect of fiber tension variation. If there is a need to increase the centering force, more than one pair of linear centering elements 32A and 32B can be used in a sequence, with each following pair turned anywhere between 0° and 180° around the bare optical fiber 20 in respect to the prior pair, in order to make the centering effect less dependent on the direction.

As shown in FIG. 10, the bare optical fiber 20 within the wedge-shaped channel 44 floats on the forced high pressure air 45 which passes between the fiber 20 and wedge-shaped side walls 40 and 42 in a manner that prevents contact between fiber 20 and walls 40 and 42. The high pressure air 45 diminishes in pressure as it exits channel 38 and passes outward through the wedge-shaped channel 44, such that the drop in pressure allows for the fiber 20 to move very little despite changes in draw tension that may occur during the production process.

Figures 11, 12, 13:
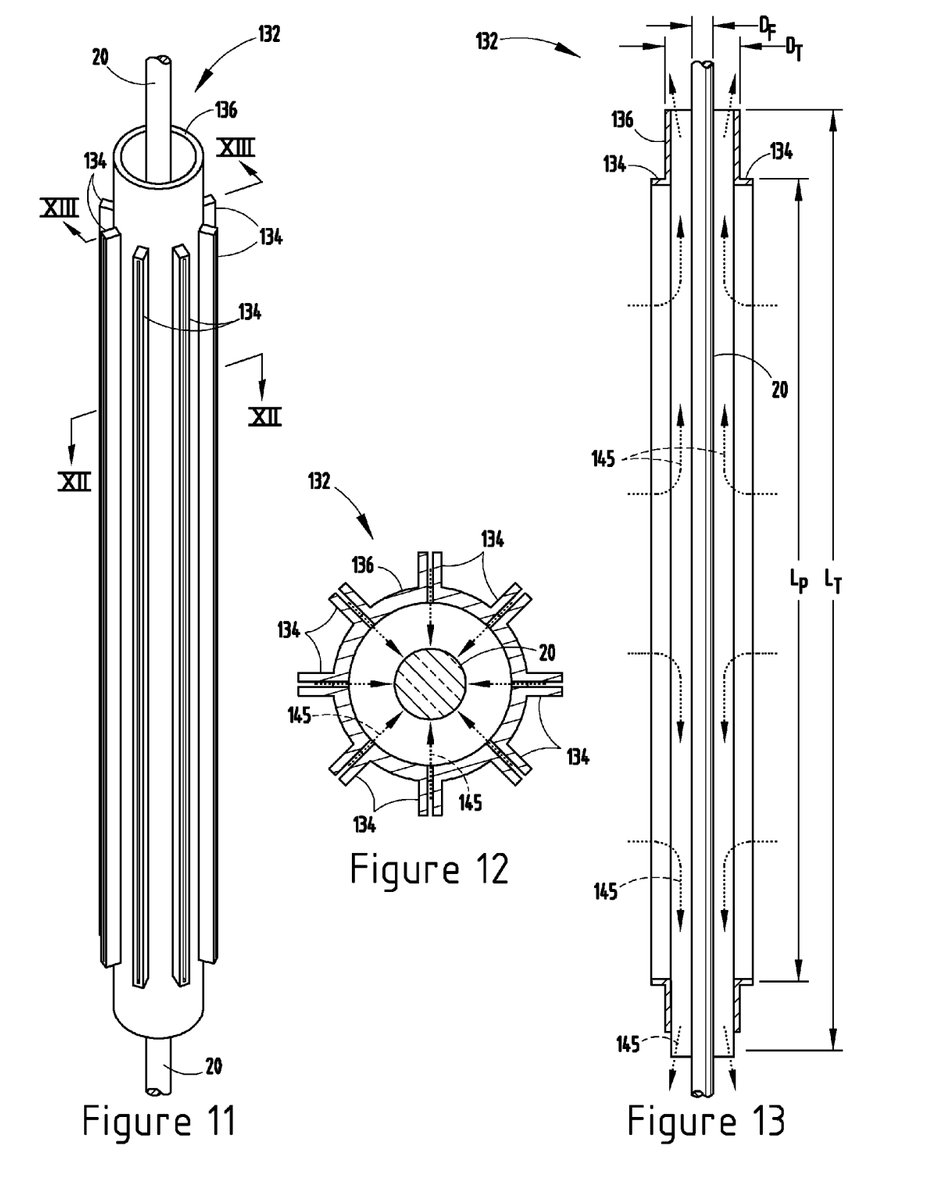
FIG. 11 is a perspective view of a linear non-contact fiber centering device, according to a second embodiment.
FIG. 12 is a cross-sectional view of the linear non-contact fiber centering device taken through line XII-XII in FIG. 11.
FIG. 13 is a cross-sectional view of the fiber centering device taken through line XIII-XIII in FIG. 11.

A linear non-contact optical fiber centering device 132 is shown in FIGS. 11 through 13, according to a second embodiment. Centering device 132 may be used as an alternative to centering device 32 shown in FIG. 7 to center the bare optical fiber 20 exiting treatment device 18. In this embodiment, a centering tube element 136 is employed to achieve a very low angular dependence of the centering force. The tube 136 has a side wall defining a cylindrical opening and first and second opposite ends for receiving and exiting the bare optical fiber 20. In addition, the centering device 132 includes a plurality of fluid injection ports 134 radially located around a perimeter of the side wall of the tube 136 and adapted to connect in fluid communication with air jets for directing high pressure fluid, such as air, radially inward toward the bare optical fiber 20 so as to maintain the optical fiber substantially centered within the tube 136 and prevent mechanical contact with the side wall of the tube 136. The air flow injected at fluid injection ports 134 flows between the bare optical fiber 20 and the inside wall of tube 136 and out the opposite ends.

In the embodiment shown, the fluid injection ports 134 with air jets (not shown) include at least eight equiangularly spaced fluid injection ports 134. In this embodiment, the bare optical fiber 20 may be situated inside the straight circular tube 136 with a diameter between 1 and 20 times greater than the fiber diameter $D_F$. According to one embodiment, the tube 136 may have a circular cross section inside diameter less than 1 millimeters which works well with a bare optical fiber 20 having an outer diameter of about 125 microns. In one embodiment, the ratio of the inside diameter $D_T$ of the tube 136 to the outside diameter $D_F$ of the fiber 20 is less than 20:1, and more preferably of less than 10:1. There are several slot holes or ports 134 in the tube 136 along its axis, allowing the series of air jets entering the gap between the fiber and the tube wall 136. Displacement of the fiber 20 may change the air flow in the tube 136, which results in a centering force with both pressure and friction components, thereby centering the bare optical fiber 20 within the tube 136. The tube 136 may have a length $L_T$ such as less than 50 centimeters, and more preferably less than 25 centimeters, according to one embodiment. The fluid injection ports 134 may have a length $L_P$ less than 90 percent of the tube length $L_T$.

It should be appreciated that the linear non-contact optical centering devices 32 and 132 advantageously center the bare optical fiber 20 leaving the exit port 28 of the treatment device 18 so as to prevent mechanical contact of the bare optical fiber 20 with the exit port, according to one embodiment. It should be appreciated that the linear non-contact optical centering device 32 or 132 may be employed in other locations within the optical fiber production system to center the bare optical fiber 20. Additionally, it should be appreciated that the forced air used for centering the bare optical fiber 20 provides for an increased cooling rate of the optical fiber as it passes through the centering device 32, following its controlled cooling in the treatment device 18. Downstream from the centering device, the optical fiber may pass through one or more fluid bearings, and may be coated by a coating unit, before being wound onto a draw mechanism and spool.

The methods herein can be employed to make single mode or multimode optical fibers for use in the telecommunications applications, particularly those that do not require a hermetic coating applied thereto. These methods can be employed without having to use helium cooling devices. In any of the above described embodiments, the centering device is preferably located within 1 meter, more preferably within 0.5 meter, even more preferably within 20 cm, and most preferably within 15 cm of the exit orifice of the treatment device. It will be apparent to those skilled in the art that various modifications and variations can be made without departing from the spirit or scope of the claims.

What is claimed is:

1. A method for producing an optical fiber, said method comprising the steps of:
   drawing an optical fiber from a heated glass source in a furnace;
   treating the optical fiber by maintaining the optical fiber in a treatment device to cool the optical fiber at a rate that is slower than the cooling rate of the fiber in air at 25° C. and a pressure of 1 atm.; and reducing pressure in at least one of the furnace and the treatment device such that the pressure in the at least one of the furnace and the treatment device is in the range of 0.05 to 0.30 atm.

2. The method of claim 1, wherein the optical fiber exits the treatment device at a temperature above 500° C.

3. The method of claim 1 wherein both of the furnace and the treatment device exhibit a pressure in the range of 0.05 to 0.30 atm.

4. The method of claim 1 further comprising the step of applying an inert gas to at least one of the furnace and the treatment device.

5. The method of claim 4, wherein the furnace is substantially free of helium.

6. The method of claim 1, wherein the step of reducing pressure comprises reducing pressure in multiple stages of the treatment device such that each stage has a different reduced pressure to provide different cooling rates.

7. The method of claim 6, wherein the multiple cooling stages are achieved by employing an orifice between adjacent stages which allows the optical fiber to pass through the orifice.

8. The method of claim 1, wherein the treatment device comprises a seal formed at one end opposite the furnace, said seal having an opening therein through which the optical fiber exits the treatment device and further comprising the step of controlling the placement of the optical fiber exiting the seal of the treatment device by centering the fiber with a non-contact centering device.

9. The method of claim 8, wherein the seal comprises a plurality of openings having different opening sizes, wherein the optical fiber exits through the plurality of openings.

10. The method of claim 1, wherein the optical fiber passes through the treatment device at a speed in excess of 20 meters per second for a time period of 0.2 seconds or less and cools the optical fiber by a temperature drop of at least 800° C.

11. The method of claim 1 further comprising the step of cooling the optical fiber in the treatment device with a fan.

12. The method of claim 1 further comprising the step of heating a portion of the treatment device to a temperature in the range of 200° C. to 600° C.

13. A method for producing an optical fiber, said method comprising the steps of:

drawing an optical fiber from a heated glass source in a furnace;

treating the optical fiber by maintaining the optical fiber in a treatment device to cool the optical fiber at a rate that is slower than the cooling rate of the fiber in air at 25° C. and a pressure of 1 atm; and reducing pressure in at least one of the furnace and the treatment device such that the pressure in the at least one of the furnace and the treatment device is in the range of 0.01 to 0.80 atm, wherein the optical fiber passes through the treatment device at a speed in excess of 20 meters per second for a time period of 0.2 seconds or less and cools the optical fiber by a temperature drop of at least 800° C.

* * * * *